United States Patent [19]
Waterland, III

[11] Patent Number: 5,527,047
[45] Date of Patent: Jun. 18, 1996

[54] FIRE SAFE SPIRAL WOUND GASKET WITH EXPANDED PTFE AND GRAPHITE WINDINGS

[75] Inventor: Alfred F. Waterland, III, Elkton, Md.

[73] Assignee: W. L. Gore & Associates, Inc., Newark, Del.

[21] Appl. No.: 265,562

[22] Filed: Jun. 24, 1994

Related U.S. Application Data

[63] Continuation of Ser. No. 984,158, Dec. 2, 1992, which is a continuation-in-part of Ser. No. 916,925, Jul. 20, 1992, abandoned.

[51] Int. Cl.$^6$ .................................................. F16J 15/12
[52] U.S. Cl. ................. 277/204; 277/235 R; 277/DIG. 6
[58] Field of Search .................................. 277/204, 227, 277/233, 234, 235 R, 180, DIG. 6

[56] References Cited

U.S. PATENT DOCUMENTS

| | | | |
|---|---|---|---|
| 816,478 | 3/1906 | Kirschning | 277/204 |
| 2,882,083 | 4/1959 | Palumbo et al. | |
| 3,117,795 | 1/1964 | Price | |
| 3,926,445 | 12/1975 | Farnam | 277/204 |
| 3,953,566 | 4/1976 | Gore | |
| 4,305,567 | 12/1981 | Lunt | |
| 4,591,166 | 5/1986 | Atkinson et al. | |
| 4,629,199 | 12/1986 | Yamamoto et al. | 277/204 |
| 4,673,187 | 1/1987 | Hanson et al. | |
| 4,796,351 | 1/1989 | Gee | |
| 4,934,657 | 6/1990 | Dodson | |
| 4,961,991 | 10/1990 | Howard | |
| 5,098,625 | 3/1992 | Huang et al. | |
| 5,112,664 | 5/1992 | Waterland, III | |
| 5,126,185 | 6/1992 | Forrest et al. | |
| 5,128,209 | 7/1992 | Sakai et al. | |
| 5,161,807 | 11/1992 | Allen et al. | 277/204 X |
| 5,275,423 | 1/1994 | Allen et al. | |
| 5,286,568 | 2/1994 | Bancino et al. | |

FOREIGN PATENT DOCUMENTS

| | | | |
|---|---|---|---|
| 8706094 | 8/1987 | Germany | |
| 9113953 | 1/1992 | Germany | |
| 224571 | 9/1989 | Japan | 277/204 |

OTHER PUBLICATIONS

"Machine Design: Seals"; 3rd ed.; Mar. 13, 1967; pp. 85–88.
"Metallic Gaskets for Raised-Face Pipe Flanges and Flanged Connections (Double-Jacketed Corrugated and Spiral Wound)"; API std. 601, 7th ed.; Mar. 1988; p. 3.

*Primary Examiner*—Scott W. Cummings
*Attorney, Agent, or Firm*—David J. Johns

[57] ABSTRACT

A spiral wound gasket having multiple windings of spirally wound strips of metal, fire resistant compressible filler material and oxidizer resistant compressible filler material is disclosed. The fire resistant filler material is arranged in a region toward the outside periphery of the gasket and the oxidizer resistant compressible material is arranged in a region radially closer to the inside periphery of the gasket. The gasket has excellent sealability characteristics from low to high gasket seating stresses, and is effective for use with corrosive chemicals while providing a measure of protection in fire situations.

14 Claims, 3 Drawing Sheets

FIRE SAFE SPIRAL WOUND GASKET WITH EXPANDED PTFE AND GRAPHITE WINDINGS

CROSS REFERENCE TO RELATED APPLICATIONS

This application is a continuation of U.S. patent application Ser. No. 07/984,158, filed Dec. 2, 1992, which is a continuation-in-part of U.S. patent application Ser. No. 07/916,925, filed Jul. 20, 1992, now abandoned.

FIELD OF THE INVENTION

This invention relates generally to seals or gaskets, and more particularly to a spirally wound gasket.

BACKGROUND OF THE INVENTION

Spirally wound gaskets known in the art generally consist of alternate layers of a thin strip of metal, such as stainless steel, and a thin strip of a soft, non-metallic filler material which together are wound in a spiral to form an annular ring. The layered edges of the strips of filler materials form sealing surfaces. Suitable filler materials include various fluorocarbon polymers, asbestos, exfoliated graphite (Grafoil®) and ceramic.

The metallic strip is typically formed with a central, generally V-shaped fold or indentation throughout its length, and to either side of the fold are substantially flat portions. The filler material assumes this shape also.

The purpose of the V-shaped fold is to establish a path along which the metal strip can deform, in a resilient or elastic manner, as the gasket is compressed between the surfaces to be sealed. Effectively, the apex of the V-shape acts as a hinge about which the legs of the V pivot. Since the filler material itself is usually soft and non-resilient, the metal strip is required to force the filler to interfere with the surfaces to be sealed.

One drawback of previously known spiral wound gaskets is that they either tend to degrade upon exposure to highly corrosive oxidizing materials, as is the case with graphite filler material; or they degrade upon exposure to elevated temperatures, such as in a fire situation, as is the case with some fluoropolymer filler materials. A spiral wound gasket having the chemical inertness of polytetrafluoroethylene and the high temperature stability of graphite for leak prevention during fire situations is presently unknown.

Due to this degradation, known PTFE spiral wound gaskets are usually not acceptable for use in "fire-safe" valves or flanges. To qualify as "fire-safe", a valve or flange is subjected to high temperature as in an open flame environment and, over a fixed period of time during the test, leakage from the valve or flange must not exceed a certain limited quantity. A major application for "fire-safe" valves or flanges is in the transport of highly corrosive liquids such as concentrated sulfuric acid, the leakage of which during a fire can be disastrous.

Another disadvantage of these gaskets is that the bolt torque on the joint being sealed must be very high in order to sufficiently compress the gasket to achieve a tight seal. As a result, installation of the gaskets is lengthy, and the gaskets are not suitable for use in certain applications where the bolts or flanges may be adversely affected by the required torque.

Thus, a need exists for a gasket which provides an effective seal from low gasket sealing stress to high gasket sealing stress, which can be used with corrosive chemicals and which provides a measure of protection in fire situations.

BRIEF DESCRIPTION OF THE INVENTION

This invention is a gasket comprising multiple windings of a spirally wound strip of metal and plural strips of compressible fillers, in which at least one compressible filler is a fire resistant compressible filler material and at least one other is an oxidizer resistant compressible filler material. A strip of fire resistant compressible filler material or oxidizer resistant compressible filler material is disposed between adjacent convolutions of the metal strip with the fire resistant filler material being arranged in a region toward the outside periphery of the gasket and the oxidizer resistant compressible material being arranged in a region radially closer to the inside periphery of the gasket. The plural compressible fillers impart to a spiral wound gasket exceptional sealability characteristics from low to high gasket seating stresses and also provide a fire-safe gasket.

DETAILED DESCRIPTION OF THE INVENTION

Figure 1:
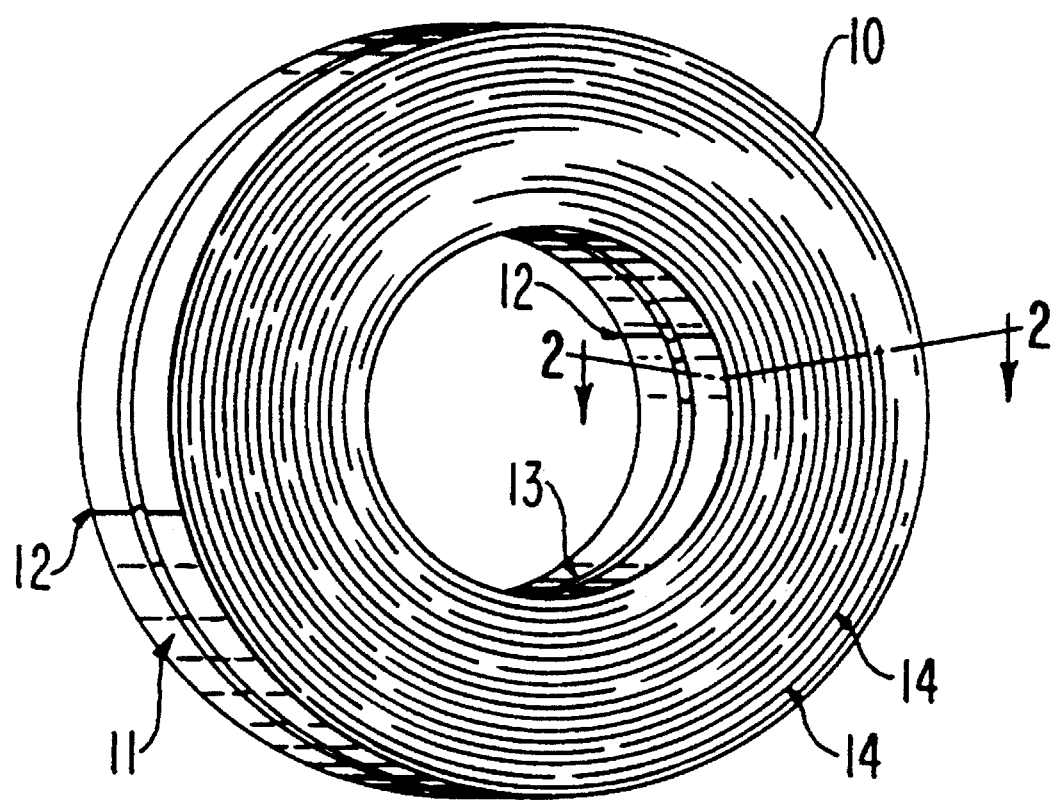
FIG. 1 is a perspective view of the gasket of the instant invention.

Referring now to the figures for a fuller description of the gasket of the invention, FIG. 1 shows a perspective view of the gasket 10 of the invention.

The gasket 10 is in the form of an annular ring having an outside periphery 11 and an inside periphery 13. Multiple windings of a spirally wound metal strip 14 are arranged throughout the gasket 10. The metal strip is attached to itself to prevent unwinding by a means for attaching the metal strip 12. The means for attaching the metal strip 12 is most commonly a spot weld. The metal strip can be made of materials used in the manufacture of metal chemical processing equipment and will be selected according to the chemical service in which it will be used. A preferred metal is stainless steel, more preferably austenitic stainless steel; however, it is recognized that, depending on the chemical environment to which the metal strip will be exposed, other materials may be selected. For example, iron, nickel, copper, cobalt, titanium, noble metals, and refractory metals, or their alloys, may also be used.

Figure 2:
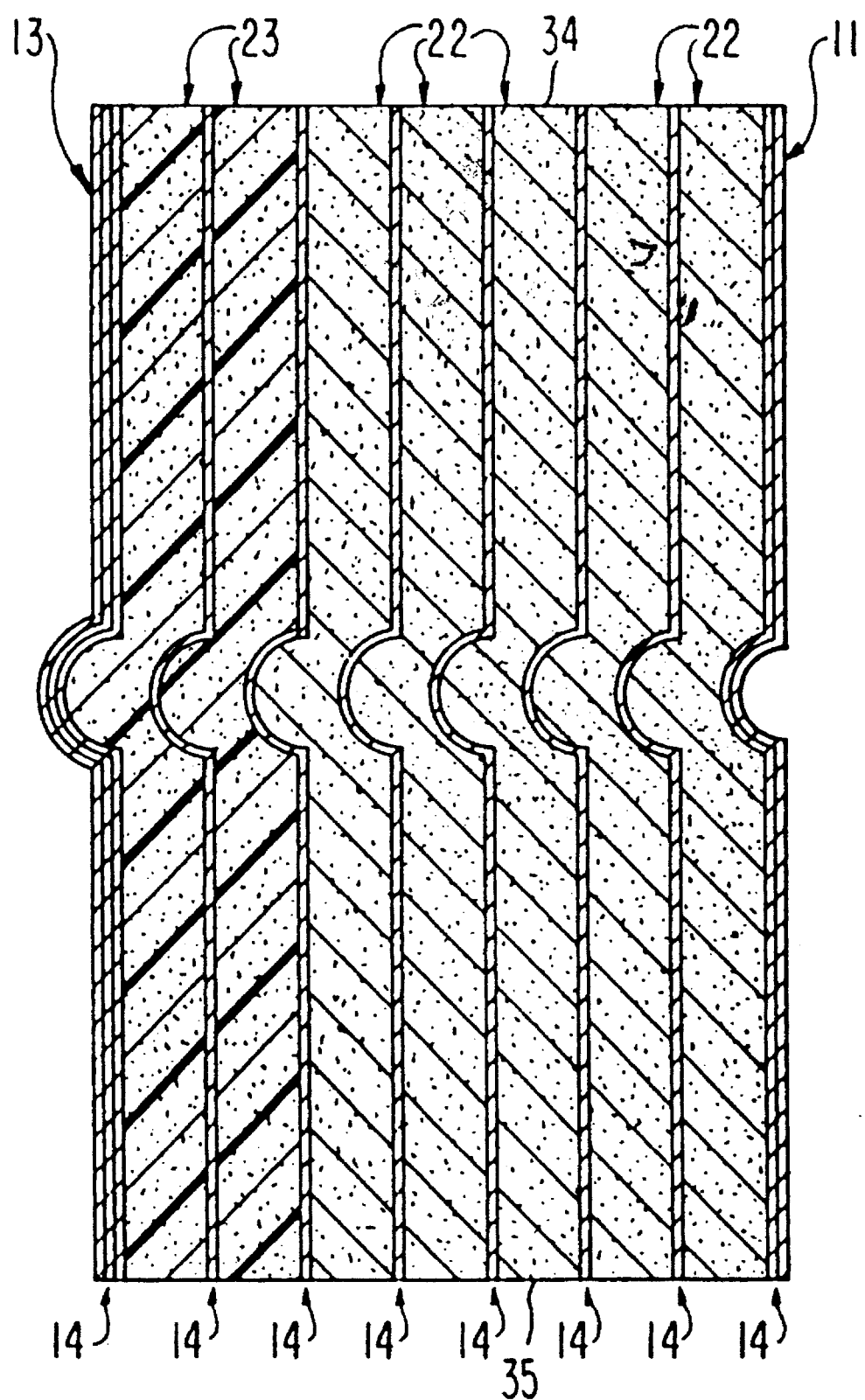
FIG. 2 is a cross sectional view of the gasket of the instant invention taken along line 2—2 in FIG. 1.

Referring now to FIG. 2, a cross section of the gasket of FIG. 1 taken along line 2—2 found in FIG. 1 is depicted. Multiple windings of spirally wound convolutions of a strip of metal 14 are depicted. On the inside periphery 13 and on the outside periphery 11, multiple layers of the metal strip 14 are found providing support to the gasket.

Still referring to FIG. 2, a strip of fire resistant compressible material 22 is disposed between adjacent spirally wound convolutions of the metal strip in the region toward the outside periphery 11 of the gasket. The fire resistant compressible material 22 may be selected from graphite material, asbestos material, ceramic material, and mixtures thereof. By graphite material, asbestos material, and ceramic material is meant material in which graphite, asbestos, or ceramic is combined with organic or inorganic fire resistant substances such as fibers, binders, cements, and the like, that may be needed to form them into compressible strips, tapes, or sheet. The preferred fire resistant compressible material is exfoliated graphite.

Still referring to FIG. 2, a strip of oxidizer resistant compressible material 23 is disposed between adjacent spirally wound convolutions of the metal strip in the region toward the inside periphery of the gasket. The oxidizer resistant compressible material 23 may be polytetrafluoroethylene, filled polytetrafluoroethylene, or porous polytetrafluoroethylene. The preferred oxidizer resistant material is expanded porous polytetrafluoroethylene produced by the process taught in U.S. Pat. No. 3,953,566 to Gore, incorporated herein by reference.

The strip of oxidizer resistant compressible material is arranged in a region toward the inside periphery of the gasket thereby providing the gasket with a measure of resistance to oxidizing materials which contact the inside periphery of the gasket when in use. The strip of fire resistant compressible material is arranged in a region toward the outside of the gasket thereby providing the gasket with a measure of resistance to elevated temperatures. The relative amounts of fire resistant compressible material and oxidizer resistant compressible material in the gasket depends upon end use requirements for the gasket. For example, if the gasket is to be in contact with a very corrosive material such as concentrated sulfuric acid, relatively more oxidizer resistant compressible material may be added to the inner region of the gasket. If however, the danger of a fire is of great concern, relatively more fire resistant compressible material may be added to the outer region of the gasket.

Another embodiment of the invention provides two regions of oxidizer resistant compressible material, one arranged adjacent to the inside periphery and the second adjacent to the outside periphery; and a region of fire resistant compressible material located between the regions of oxidizer resistant compressible material.

Figure 3:
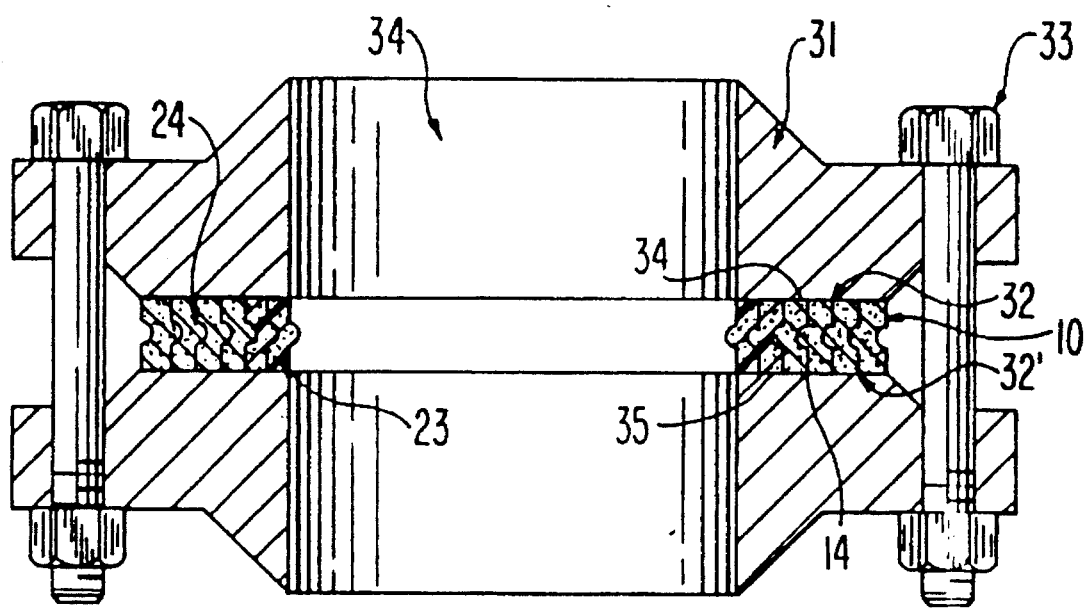
FIG. 3 is a cross section of a joint sealed with a gasket of the instant invention.

Referring now to FIG. 3, the gasket 10 is depicted as it is used in sealing a joint 31. The joint 31 comprises a pair of opposing sealing surfaces, 32 and 32', between which is interposed the gasket 10. A means for compressing the joint 33, such as a bolt, applies a compressive force upon the gasket 10 compressing the gasket 10 to a degree and thereby sealing the joint 31. The joint forms a bore 34 through which fluids may pass. The gasket 10 is arranged within the joint 31 in such a manner so that the oxidizer resistant compressible filler material 23 is arranged toward the inside periphery 13 of the gasket 10 thereby preventing contact by fluids contained within the bore 34 with the fire resistant compressible filler material 22.

As can be seen in FIGS. 2 and 3, the oxidizer resistant compressible material 23 is preferably formed substantially flush with the metal strip 14 on the gasket's top sealing surface 34 and bottom sealing surface 35. The top surface 34 and bottom surface 35 comprise those surfaces of the gasket contacting sealing surfaces 32 and 32' of the joint. As is shown in FIG. 3, the flush orientation of the compressible material 23 places metal strip 14 in direct contact with sealing surfaces 32 and 32' when mounted in place.

The instant gasket is constructed using equipment and techniques well known in the art of spiral wound gaskets. A winding machine of conventional type which tightly wraps alternate layers of a strip of compressible filler material and a strip of metal in convolutions about a mandrel having a peripheral contour corresponding to the inside periphery of the gaskets is used to fabricate the instant gasket. The metal strip, also in accordance with conventional practice, may be initially wound upon the mandrel for one or more convolutions and then spot welded to prevent it from unwinding. Next, a strip of the oxidizer resistant compressible material is interposed between the convolutions of the metal strip and they are jointly wrapped to form an oxidizer resistant region. After the oxidizer resistant compressible material region is developed a strip of fire resistant compressible material is interposed between the convolutions of the metal strip and, in like manner, a fire resistant region is developed. As is also convention, the last few convolutions to be wound may comprise only the metal strip which may be attached to itself to prevent unwinding by a means for attaching the metal strip, such as a spot weld.

Test Descriptions

Gasket Fire Test

The Pressure Vessel Research Council (PVRC) has sponsored the development of a repeatable fire exposure test that sets pass/fail criteria based on gasket leakage after exposure to fire temperatures. Minimum performance of compressed asbestos is used as the criteria.

A 4" nominal pipe size gasket is loaded in the FITT test rig. The gasket is compressed to 8090 psi (55.7 MPa) stress in this test fixture, at room temperature, and then helium leakage at 400 psig (27.2 BAR) is measured. The gasket stress is then manually reduced to 5000 psi (34.5 MPa) to allow transport to the heated platens.

The fixture is then placed between platens preheated to 677° C. As the fixture and gasket heat up, the gasket stress is further lowered to 1500 psi (10.3 MPa). Helium pressure is maintained at 400 psig (27.2 BAR) during the heat soak. Time at temperature is 15 minutes.

Leakage during and at the end of the heat cycle is compared to the initial room temperature value. A calculated tightness parameter less than 32 indicates that the gasket performs worse than asbestos and thus fails the test.

Four spiral wound gasket examples of the invention were prepared as described above and tested according to the Gasket Fire Test. The results are shown in Table 1.

Room Temperature Operational Tightness Test (ROTT)

The ROTT is a sealability performance test developed by the Pressure Vessel Research Council (PVRC). The gaskets were tested at the Ecole Polytechnique, Montreal, Canada, according to the procedures of ASTM F-586—Draft #8 (available from the Section of Applied Mechanics).

Test gaskets are placed between rigid platens which are tightened to specific gasket seating stresses. At each seating stress the gasket is subjected to internal pressures of 400 and 800 psig (27.2 and 54.4 Bar) Helium. At each seating stress/internal pressure level the Helium mass leak rate is measured by a pressure decay method and a Tightness Parameter (Tp) is calculated as shown below.

$$Tp = (P/P^*)(L^*/L)^{1/2}$$

P=Internal Pressure (psig)
$P^*$=Standard Atmospheric Pressure (14.7 psig)
$L^*$=Reference Mass Leak Rate (1.0 mg/sec He for a 150 mm OD gasket)
L=Mass Leak Rate (mg/sec)

A Tp of 1 produces 1 mg/sec leakage at 15 psig (1.03 Bar), and a Tp of 100 produces 10,000 times less leakage, i.e., 0.0001 mg/sec.

After the leak test at each initial seating stress/internal pressure level, the seating stress is reduced and reapplied (unload-reload), and the leak tests are repeated. By plotting graphs of Tp versus gasket initial and reload seating stress, gasket constants "Gb", "a", and "Gs" are obtained.

"Gb" is the stress value of the initial stress loading curve at Tp=1.

"a" is the slope of the loading curve

"Gs" is the stress value of the reload stress loading curve at Tp=1.

A gasket with low constants is desirable because it means that it requires low initial sealing stress, will develop high levels of tightness at low gasket stress, and is not sensitive to gasket stress unloading. Thus, a flat line on the loading curve indicates that a gasket will develop high levels of tightness with small changes in applied stress.

The gasket of Example 2 and two comparative gaskets were tested by the ROTT. Test results are shown in Table 2.

The following examples are presented to further explain the teachings of the instant invention and not to limit the scope of the invention. Various modifications and equivalents will readily suggest themselves to those of ordinary skill in the art without departing from the spirit and scope of the instant invention.

Example 1

A 4-inch nominal pipe size plural-filler spiral wound gasket was prepared.

First, a continuous flat metal strip, 0.223 inch (5.66 mm) wide and 0.010 inch (0.25 mm) thick of Type 316L stainless steel, was fed onto a forming mandrel of a conventional spiral gasket winding machine. After wrapping a few convolutions of the metal strip on the mandrel the shaped strip was spot welded to prevent unwinding, and to establish the inside diameter of the gasket.

Then, a compressible filler material strip 0.188 inch (4.77 mm) wide and 0.040 inch (1.02 mm) of porous expanded polytetrafluoroethylene (obtained from W. L. Gore & Associates, Inc.). The porous expanded polytetrafluoroethylene strip had a bulk density of 0.60 grams/cc. The strip was interposed between the convolutions of the metal strip to form alternating layers, and both strips tightly wrapped together so that the compressible filler material assumed the contour of the formed metal strip. The wrapping continued until a point about ⅓ of the final width of the gasket was reached.

At this point, the porous expanded polytetrafluoroethylene strip was cut and a strip of a second compressible filler material, 0.228 inch (5.8 mm) wide and 0.017 inch (0.43 mm) thick of Grafoil® exfoliated graphite (obtained from UCAR Carbon Co.), was butted against the end of the porous expanded polytetrafluoroethylene strip. Wrapping of the stainless steel and exfoliated graphite strips was continued in the manner described above until the outer ⅔ of the width of the gasket was formed. At this point, the exfoliated graphite strip was cut and a few convolutions of the metal strip only were wrapped and spot welded together to prevent unwinding, and to establish the outer diameter of the gasket.

The gasket thus prepared was 3/16 inch (4.7 mm) thick. The inside diameter was 4 ⅞ inches (123.8 mm) and the outside diameter was 5 ⅞ inches (149.2 mm). Approximately, the inner ⅓ of the width of the gasket contained porous expanded polytetrafluoroethylene as the compressible filler material, and the outer ⅔ of the width of the gasket contained Grafoil as the compressible filler material.

The gasket was subjected to the Gasket Fire Test. The test results are included in Table 1.

Example 2

A 4" nominal pipe size plural-filler spiral wound gasket was prepared as described in Example 1 except that, approximately, the inner ½ of the width of the gasket contained porous expanded polytetrafluoroethylene as the compressible filler material, and the outer ½ of the width of the gasket contained exfoliated graphite as the compressible filler material.

The gasket was subjected to the Gasket Fire Test and to the Room Temperature Operational Tightness Test. Test results are included in Table 1 and Table 2.

Example 3

A 4" nominal pipe size plural-filler spiral wound gasket was prepared as described in Example 1 except that, approximately, the inner ⅓ of the width of the gasket contained porous expanded polytetrafluoroethylene as the compressible filler material, the middle ⅓ of the width of the gasket contained exfoliated graphite as the compressible filler material, and the outer ⅓ of the width of the gasket contained porous expanded polytetrafluoroethylene as the compressible filler material.

The gasket was subjected to the Gasket Fire Test. The test results are included in Table 1.

Example 4

A 4" nominal pipe size plural-filler spiral wound gasket was prepared as described in Example 1 except that, approximately, the inner ⅔ of the width of the gasket contained porous expanded polytetrafluoroethylene as the compressible filler material, and the outer ⅓ of the width of the gasket contained exfoliated graphite as the compressible filler material.

The gasket was subjected to the Gasket Fire Test. The test results are included in Table 1.

Also tested for comparative purposes were 2 commercially available spiral wound gaskets and one alternative fire-safe gasket. Each of the commercially available spiral wound gaskets contained a single material only between the metal windings. The commercial spiral wound gaskets contained exfoliated graphite or polytetrafluoroethylene between the metal windings. The alternative fire-safe gasket evaluated was a compressed asbestos cut sheet gasket which was subjected to the Gasket Fire Test only. Test results are included in Tables 1 and 2.

TABLE 1

| Material | Pass/ Fail | Room Temperature Tightness | Post Test Tightness |
| --- | --- | --- | --- |
| Example 1 | Pass | >2000 (note 1) | >280 (note 2) |
| Example 2 | Pass | >2000 (note 1) | >280 (note 2) |
| Example 3 | Pass | >2000 (note 1) | >280 (note 2) |
| Example 4 | Pass | >2000 (note 1) | >280 (note 2) |
| Asbestos | Pass | <700 | <70 |
| Exfoliated graphite | Pass | >2000 | >280 |
| PTFE windings | Fail | >2000 | 2 |

NOTE 1: Tightness parameter of 2000 is the highest resolution (at room temperature) of the leak detection equipment.
NOTE 2: Tightness parameter of 280 is the highest resolution (at 1200° F.) of the leak detection equipment.

It is obvious from the testing that the fire resistance of the gasket of the invention is at least equal to that of a spirally wound gasket solely filled with exfoliated graphite. Also, the gasket of the invention shows substantial improvement in terms of fire resistance with respect to a spiral wound gasket solely filled with polytetrafluoroethylene.

TABLE 2

| Gasket | a | Gb (MPa) | Gs (MPa) | Tp @ 6.90 MPa | Tp @ 31.0 MPa | Tp @ 55.2 MPa | Tp @ 75.8 MPa | Tp @ >103.4 MPa |
|---|---|---|---|---|---|---|---|---|
| Example 2 Spiral Wound | .214 | 11.08 | 0.03 | 44 | 642 | 6,330 | 37,530 | >50,000 |
| Graphite Spiral Wound | .387 | 4.24 | 0.03 | 36 | 502 | 1,910 | 6,590 | 6,610 |
| PTFE Spiral Wound | .143 | 19.88 | 0.72 | 9 | 65 | 15,910 | 33,300 | >50,000 |

It is apparent from the testing that the gasket of the invention has excellent sealability from low applied gasket stress to high applied gasket stress. Thus, for the first time, a spiral wound gasket with excellent sealability over the full range of gasket sealing forces is available.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. A spiral wound gasket, the gasket having an inside periphery and an outside periphery and a top sealing surface and a bottom sealing surface, which comprises:

a spirally wound strip extending between the inside periphery and the outside periphery of the gasket;

a fire resistant filler material disposed between windings of the strip comprising a graphite;

an oxidizer resistant compressible filler material comprising expanded polytetrafluoroethylene (PTFE) disposed between windings of the strip in an area adjacent to the inside periphery, the expanded PTFE being substantially flush with the strip on the gasket's top surface and bottom surface;

wherein the gasket is both fire resistant and provides an effective seal at low gasket seating stresses.

2. A gasket as in claim 1 wherein the strip of fire resistant compressible filler material is exfoliated graphite.

3. A gasket as in claim 1 wherein the strip of fire resistant compressible filler material comprises asbestos material.

4. A gasket as in claim 1 wherein the strip of fire resistant compressible filler material comprises ceramic material.

5. A gasket as in claim 1 wherein the polytetrafluoroethylene is porous polytetrafluoroethylene.

6. A gasket as in claim 1 wherein the polytetrafluoroethylene contains a filler.

7. The gasket of claim 1 wherein the strip is in direct contact with sealing surfaces of a joint when mounted in place.

8. The gasket of claim 1 wherein the gasket provides a tightness parameter (Tp) of at least about 44 at a gasket stress level of 6.90 MPa.

9. The gasket of claim 1 wherein the gasket provides a tight seal from low to high seating stresses.

10. The gasket of claim 1 wherein the fire resistant material is disposed within the windings in an area adjacent to the outside periphery of the gasket.

11. A spiral wound gasket which comprises:

a spiral wound metal strip extending from an inside periphery to an outside periphery;

a compressible filler material comprising an expanded polytetrafluoroethylene (PTFE) disposed between windings of the metal strip adjacent to the inside periphery, the expanded PTFE being formed to be substantially flush with the metal strip on sealing surfaces of the gasket;

a fire resistant graphite filler material disposed between windings of the strip;

wherein the gasket is both fire safe and provides a tight seal at low gasket seating stresses.

12. The gasket of claim 11 wherein the gasket forms a tight seal from low applied gasket stress to high applied gasket stress.

13. The gasket of claim 11 wherein the metal strip is in direct contact with sealing surfaces of a joint when mounted in place.

14. The gasket of claim 11 wherein fire resistant filler is disposed within the windings adjacent to the outside periphery of the gasket.

* * * * *